(12) United States Patent
Bhandari et al.

(10) Patent No.: US 10,198,089 B2
(45) Date of Patent: Feb. 5, 2019

(54) ACTIVE STYLUS PRECISION TIP

(71) Applicant: Apple Inc., Cupertino, CA (US)

(72) Inventors: Priyanka Bhandari, San Francisco, CA (US); Blake R. Marshall, San Jose, CA (US); Li-Quan Tan, Sunnyvale, CA (US); Reza Nasiri Mahalati, Belmont, CA (US); Aidan N. Zimmerman, Sunnyvale, CA (US); Ryan P. Brooks, Menlo Park, CA (US); Kevin C. Armendariz, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 14/848,289

(22) Filed: Sep. 8, 2015

(65) Prior Publication Data

US 2017/0068344 A1 Mar. 9, 2017

(51) Int. Cl.
*G06F 3/0354* (2013.01)
*G06F 3/0338* (2013.01)
(Continued)

(52) U.S. Cl.
CPC ........ *G06F 3/03545* (2013.01); *G06F 3/0338* (2013.01); *G06F 3/0383* (2013.01); *G06F 3/044* (2013.01)

(58) Field of Classification Search
CPC .................................................. G06F 3/03545
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

EP 2 624 104 A2 8/2013
EP 2 624 104 A3 8/2013
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
(Continued)

*Primary Examiner* — Amare Mengistu
*Assistant Examiner* — Shawna T Stepp Jones
(74) *Attorney, Agent, or Firm* — Morrison & Foerster LLP

(57) ABSTRACT

An electrode for an input device can be designed to reduce wobble over a range of input device orientations. The electrode can include a spherical portion and a tapered portion. In some examples, the electrode can linearly taper away from the spherical portion. In other examples, the electrode can non-linearly taper away forming an elliptical flare. Additionally or alternatively, the electrode can include a spring-loaded member that can couple the electrode to other circuitry of the input device. Additionally or alternatively, the electrode can include a neck portion coupled to the tapered portion, and part of the neck portion can be shielded. The input device can include a first non-conductive material disposed on part of the spherical portion of the electrode and a second non-conductive material disposed between part of the electrode and the first non-conductive material.

22 Claims, 13 Drawing Sheets

(51) Int. Cl.
  *G06F 3/044* (2006.01)
  *G06F 3/038* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,199,132 | B1 * | 6/2012 | Oda .................. G06F 3/03545 178/19.03 |
| 8,479,122 | B2 | 7/2013 | Hotelling et al. |
| 9,612,671 | B1 * | 4/2017 | Blaszczak ............... G06F 3/039 |
| 2006/0197753 | A1 | 9/2006 | Hotelling |
| 2007/0195068 | A1 | 8/2007 | Kable et al. |
| 2009/0289922 | A1 * | 11/2009 | Henry ................. G06F 3/03545 345/179 |
| 2013/0141397 | A1 | 6/2013 | Dunagan |
| 2015/0123923 | A1 | 5/2015 | Stern |
| 2015/0138164 | A1 * | 5/2015 | Hinson .................. G06F 3/0383 345/179 |
| 2015/0160744 | A1 | 6/2015 | Mohindra et al. |
| 2015/0193024 | A1 | 7/2015 | Kai et al. |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Nov. 18, 2016, for PCT Application No. PCT/US2016/048630, four pages.

* cited by examiner

ACTIVE STYLUS PRECISION TIP

FIELD

This relates generally to input devices for use with touch-sensitive devices and, more specifically, to the design of the tip electrode of an active stylus.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision and control of the stylus. However, detecting the location of an active stylus at a touch-sensitive device with precision can be difficult when the active stylus is used at different orientation angles.

SUMMARY

This relates to an electrode that can be used, for example, in input devices such as an active stylus. The electrode can be designed to improve the precision of location detection of the active stylus. For example, the electrode can be designed to reduce wobble over a range of orientation angles and mitigate orientation dependence of a wobble metric. The electrode can include a spherical portion and can include a spring-loaded contact member configured to couple the electrode to additional conductors. The electrode can also include a tapered portion in which the electrode linearly tapers away from the spherical portion toward the spring-loaded contact member. Additionally or alternatively, the electrode can include a tapered portion in which the electrode tapers away from the spherical portion toward the spring-loaded contact member, forming an elliptical flare. Additionally or alternatively, the electrode can include a neck portion. The spring-loaded contact member can extend from the neck portion and/or from the spherical portion.

This also relates to a removable tip portion for an input device, such as an active stylus. The removable tip portion can include an electrode including a spherical portion facing a tip of the tip portion and a tapered portion in which the electrode tapers away from the tip of the tip portion, and a first non-conductive material disposed on at least part of the spherical portion of the electrode. The removable tip portion can also include a connector to couple the removable tip portion to another portion of the input device (e.g., the shaft of the active stylus). In some examples, the electrode can linearly taper away from the tip of the tip portion. Additionally or alternatively, the electrode can taper away from the tip of the tip portion, forming an elliptical flare. Additionally or alternatively, the electrode can include a spring-loaded contact member that can be configured to couple the electrode to stimulation circuitry or other circuitry of the input device. Additionally or alternatively, the electrode can include a neck portion coupled to the tapered portion. The dimensions of a first surface of the neck portion coupled to the tapered portion can be smaller than or equal to dimensions of a second surface of the tapered portion coupled to the neck portion. Additionally or alternatively, part of the neck portion of the electrode can be shielded. Additionally or alternatively, air can fill a space between the neck portion and the first non-conductive material or between the neck portion and a second non-conductive material. Additionally or alternatively, the first non-conductive material can be disposed directly on the surface of the electrode. Additionally or alternatively, the removable tip portion can include one or more ground regions at an area of the tip portion distant from the spherical portion of the electrode. Additionally or alternatively, the removable tip portion can include a second non-conductive material disposed between at least part of the electrode and the first non-conductive material.

This also relates to an input device (e.g., an active stylus) including a body including a shaft portion and a tip portion, an electrode at the distal end of the input device and disposed in the tip portion, the electrode including a spherical portion facing the distal end of the input device and a tapered portion in which the electrode tapers away from the distal end of the input device, a first non-conductive material disposed on at least part of the spherical portion of the electrode; and stimulation circuitry coupled to the electrode and configured to generate one or more stimulation signals. In some examples, the electrode can linearly taper away from the distal end of the input device. Additionally or alternatively, the electrode can taper away from the distal end of the input device forming an elliptical flare. Additionally or alternatively, the electrode can include a spring-loaded contact member that can be configured to couple the electrode to stimulation circuitry or other circuitry of the input device. Additionally or alternatively, the electrode can include a neck portion coupled to the tapered portion. The dimensions of a first surface of the neck portion coupled to the tapered portion can be smaller than or equal to dimensions of a second surface of the tapered portion coupled to the neck portion. Additionally or alternatively, part of the neck portion of the electrode can be shielded. Additionally or alternatively, air can fill a space between the neck portion and the first non-conductive material or between the neck portion and a second non-conductive material. Additionally or alternatively, the first non-conductive material can be disposed directly on the surface of the electrode. Additionally or alternatively, the input device can include ground regions at the proximal end of the tip portion of the body of the input device. Additionally or alternatively, the input device can include a second non-conductive material disposed between at least part of the electrode and the first non-conductive material. Additionally or alternatively, the tip portion of the body of the input device can be configured to be separated from the shaft portion of the body of the input device.

DETAILED DESCRIPTION

Figure 1A:
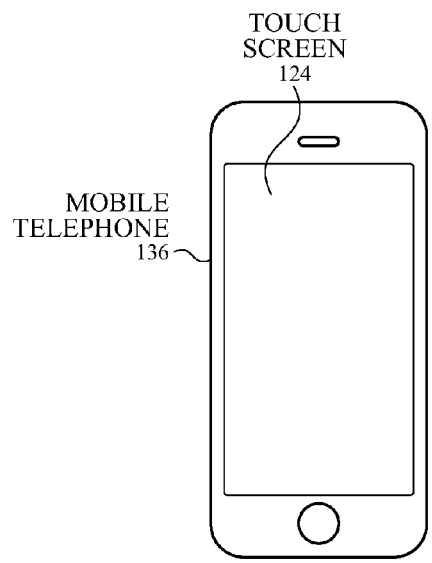
FIGS. 1A-1D illustrate examples of systems with touch screens that can accept input from an active stylus according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

This relates to an electrode that can be used, for example, in input devices such as an active stylus. The electrode can be designed to improve the precision of location detection of the active stylus. For example, the electrode can be designed to reduce wobble over a range of orientation angles and mitigate orientation dependence of a wobble metric. The electrode can include a spherical portion and can include a spring-loaded contact member configured to couple the electrode to additional conductors. The electrode can also include a tapered portion in which the electrode linearly tapers away from the spherical portion toward the spring-loaded contact member. Additionally or alternatively, the electrode can include a tapered portion in which the electrode tapers away from the spherical portion toward the spring-loaded contact member, forming an elliptical flare. Additionally or alternatively, the electrode can include a neck portion. The spring-loaded contact member can extend from the neck portion and/or from the spherical portion.

This also relates to a removable tip portion for an input device, such as an active stylus. The removable tip portion can include an electrode including a spherical portion facing a tip of the tip portion and a tapered portion in which the electrode tapers away from the tip of the tip portion, and a first non-conductive material disposed on at least part of the spherical portion of the electrode. The removable tip portion can also include a connector to couple the removable tip portion to another portion of the input device (e.g., the shaft of the active stylus). In some examples, the electrode can linearly taper away from the tip of the tip portion. Additionally or alternatively, the electrode can taper away from the tip of the tip portion, forming an elliptical flare. Additionally or alternatively, the electrode can include a spring-loaded contact member that can be configured to couple the electrode to stimulation circuitry or other circuitry of the input device. Additionally or alternatively, the electrode can include a neck portion coupled to the tapered portion. The dimensions of a first surface of the neck portion coupled to the tapered portion can be smaller than or equal to dimensions of a second surface of the tapered portion coupled to the neck portion. Additionally or alternatively, part of the neck portion of the electrode can be shielded. Additionally or alternatively, air can fill a space between the neck portion and the first non-conductive material or between the neck portion and a second non-conductive material. Additionally or alternatively, the first non-conductive material can be disposed directly on the surface of the electrode. Additionally or alternatively, the removable tip portion can include one or more ground regions at an area of the tip portion distant from the spherical portion of the electrode. Additionally or alternatively, the removable tip portion can include a second non-conductive material disposed between at least part of the electrode and the first non-conductive material.

This also relates to an input device (e.g., an active stylus) including a body including a shaft portion and a tip portion, an electrode at the distal end of the input device and disposed in the tip portion, the electrode including a spherical portion facing the distal end of the input device and a tapered portion in which the electrode tapers away from the distal end of the input device, a first non-conductive material disposed on at least part of the spherical portion of the electrode; and stimulation circuitry coupled to the electrode and configured to generate one or more stimulation signals. In some examples, the electrode can linearly taper away from the distal end of the input device. Additionally or alternatively, the electrode can taper away from the distal end of the input device forming an elliptical flare. Additionally or alternatively, the electrode can include a spring-loaded contact member that can be configured to couple the electrode to stimulation circuitry or other circuitry of the input device. Additionally or alternatively, the electrode can include a neck portion coupled to the tapered portion. The dimensions of a first surface of the neck portion coupled to the tapered portion can be smaller than or equal to dimensions of a second surface of the tapered portion coupled to the neck portion. Additionally or alternatively, part of the neck portion of the electrode can be shielded. Additionally or alternatively, air can fill a space between the neck portion and the first non-conductive material or between the neck portion and a second non-conductive material. Additionally or alternatively, the first non-conductive material can be disposed directly on the surface of the electrode. Additionally or alternatively, the input device can include ground regions at the proximal end of the tip portion of the body of the input device. Additionally or alternatively, the input device can include a second non-conductive material disposed between at least part of the electrode and the first non-conductive material. Additionally or alternatively, the tip portion of the body of the input device can be configured to be separated from the shaft portion of the body of the input device.

Figure 1B:
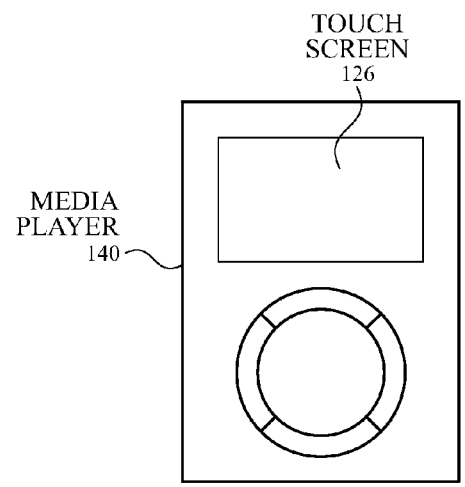
Figure 1C:
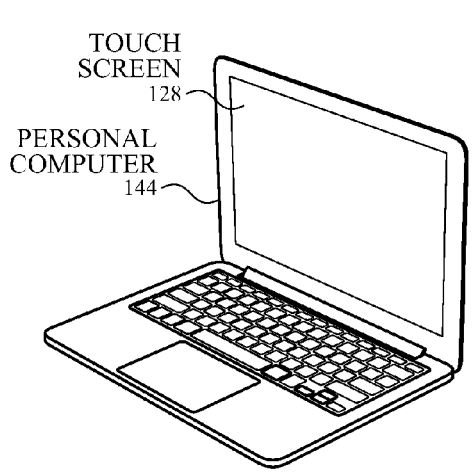
Figure 1D:
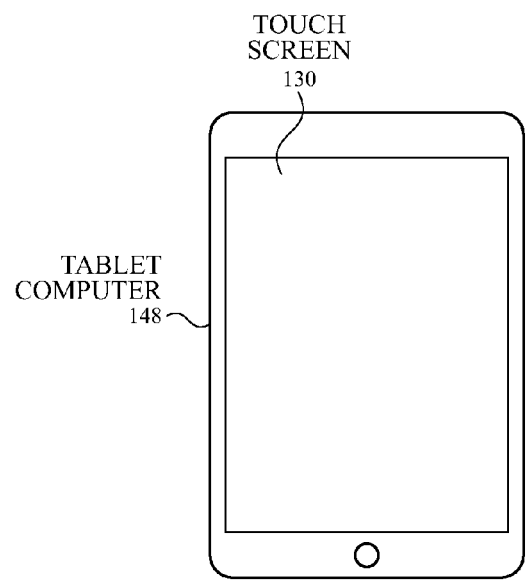

FIGS. 1A-1D illustrate examples of systems with touch screens that can accept input from an active stylus according to examples of the disclosure. FIG. 1A illustrates an exemplary mobile telephone 136 that includes a touch screen 124 that can accept input from an active stylus according to examples of the disclosure. FIG. 1B illustrates an example digital media player 140 that includes a touch screen 126 that can accept input from an active stylus according to examples of the disclosure. FIG. 1C illustrates an example personal computer 144 that includes a touch screen 128 that can accept input from an active stylus according to examples of the disclosure. FIG. 1D illustrates an example tablet computing device 148 that includes a touch screen 130 that can accept input from an active stylus according to examples of the disclosure. Other devices, including wearable devices, can accept input from an active stylus according to examples of the disclosure.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
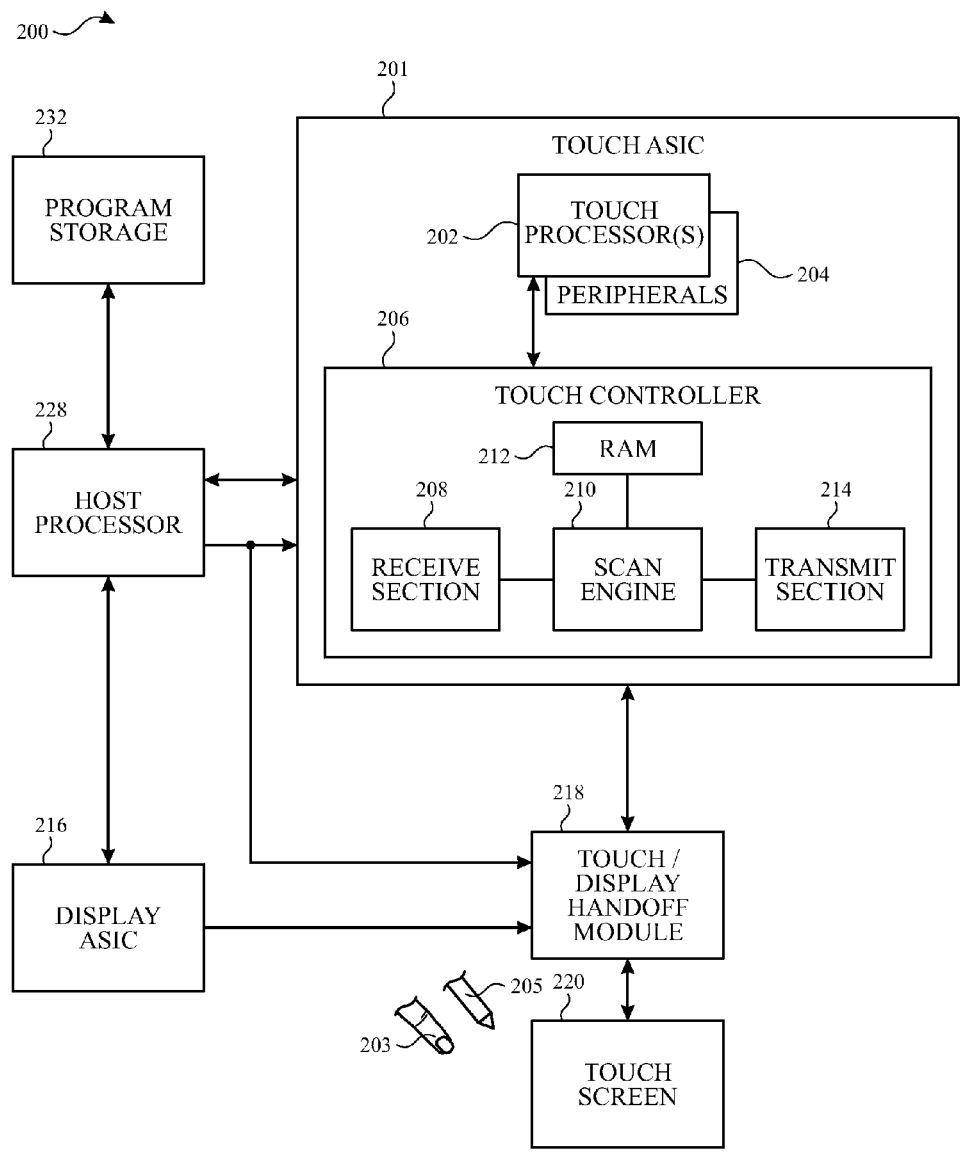
FIG. 2 illustrates a block diagram of an example computing system that can receive input from an active stylus according to examples of the disclosure.

FIG. 2 illustrates a block diagram of an example computing system 200 that can receive input from an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive section 208, panel scan engine 210 (which can include channel scan logic) and transmit section 214 (which can include analog or digital driver logic). In some examples, the transmit section 214 and receive section 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit section and receive section for the specific scan event to be performed. Results (e.g., touch signals or touch data) from the various scans can also be stored in RAM 212. In addition, panel scan engine 210 can provide control for transmit section 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
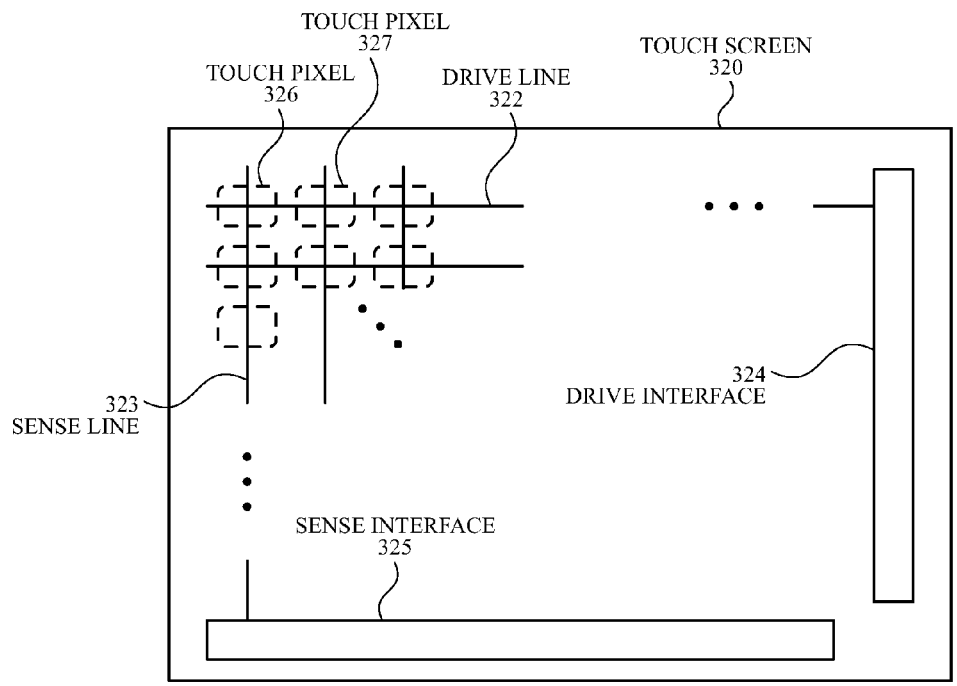
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit section 214 through a drive interface 324, and resulting sense signals generated in sense lines 323 can be transmitted through a sense interface 325 to sense channels in receive section 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
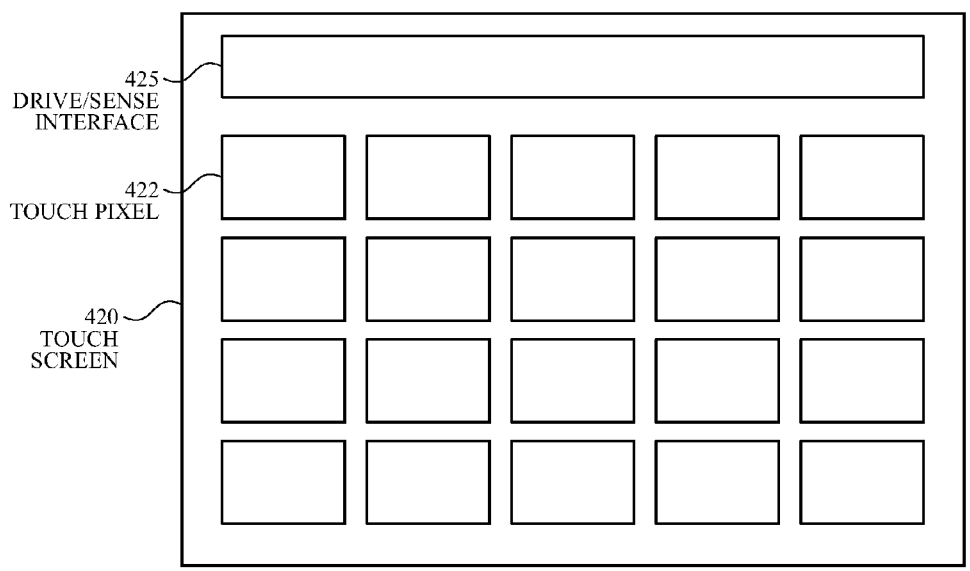
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive section 208 in touch controller 206, can be driven by stimulation signals from the sense channels (or transmit section 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

Figure 5:
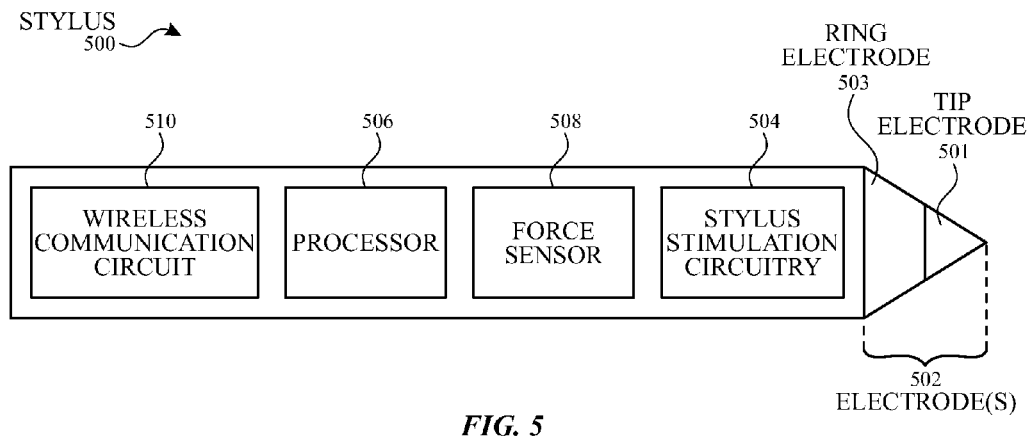
FIG. 5 illustrates an example active stylus according to examples of the disclosure.

As discussed herein, in addition to performing touch scans to detect an object such as a finger or a passive stylus, computing system 200 can also perform stylus scans to detect an active stylus and can communicate with a stylus. For example, an active stylus can be used as an input device on the surface of a touch screen of touch-sensitive device. FIG. 5 illustrates an example active stylus according to examples of the disclosure. Stylus 500 can include one or more electrodes 502, which can be located, for example, at a distal end of the stylus (e.g., the tip of the stylus). As illustrated in FIG. 5, stylus 500 can include a tip electrode 501 and a ring electrode 503. Tip electrode 501 can include a material capable of transmitting the stylus stimulation signal from stylus stimulation circuitry 504 to the touch-sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, the stylus tip can have a diameter of 2 mm or less. In some examples, the stylus tip can have a diameter between 1 mm and 2 mm. Ring electrode 503 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like.

Stylus 500 can also include stylus stimulation circuitry 504. Stylus stimulation circuitry 504 can be configured to generate one or more stylus stimulation signals at the one or more electrodes 502 to stimulate a touch-sensitive device. For example, stylus stimulation signals can be coupled from stylus 500 to the touch sensing circuitry of touch screen 220, and the received signals can be processed by the touch ASIC 201. The received signals can be used to determine a location of active stylus 500 at the surface of touch screen 220.

The operation of stylus stimulation circuitry 504 can be controlled by a processor 506. For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 500 can include more than one processor, and stylus stimulation circuitry 504 can include one or more processors. In some examples, one or more of the stylus functions described herein can be performed by firmware stored in memory or in program storage (not shown) and executed by processor 506 or a processor in stylus stimulation circuitry 504.

In some examples, stylus 500 can also include a force sensor 508 to detect the amount of force at the tip of the stylus 500. For example, when the stylus tip is touching touch screen 220, the force sensor 508 can measure the force at the stylus tip. The force information can be stored in the stylus (e.g., in a memory (not shown)) and/or transmitted (via a wired connection or wirelessly) to the computing system 200. For example, the force information can be communicated to host processor 228 or touch ASIC 201 in computing system 200. Force information and corresponding location information can be processed together by host processor 228 and/or touch ASIC 201.

In some examples, force sensor 508 can be coupled to processor 506. Processor 506 can process force information from force sensor 508 and, based on the force information, control stylus stimulation circuitry 504 to generate or not generate stylus stimulation signals. For example, the processor can cause stylus stimulation circuitry 504 to generate no stylus stimulation signals when no force is detected or when the force is below a threshold level. When a force (or a force at or above the threshold level) is detected (e.g., corresponding to touch-down of the stylus), the processor can cause stylus stimulation circuitry 504 to generate stylus stimulation signals and continue generating stylus stimulation signals until the detected force drops below the threshold level (or some other threshold level).

Stylus 500 can also include a wireless communication circuit 510, although in some examples the wireless communication functionality can be incorporated into other modules within the stylus 500, and in other examples the stylus can communicate via a wired connection. Wireless communication circuit 510 can transmit the force information from the stylus 500 to the wireless communication circuitry of computing system 200. The wireless communication circuit 510 can also receive other information including, but not limited to, information about stylus stimulus frequencies, scan plan information (i.e., the sequence of scans to be performed by the touch-sensitive device) and clock synchronization information. For example, the touch-sensitive device can transmit one or more low noise frequencies to the stylus 500, and stylus stimulation circuitry 504 can generate stimulation signals electrodes 502 based on, or at, the one or more low noise frequencies. In some examples, the stylus stimulation circuitry 504 can generate stimulation signals at two or more different frequencies (e.g., at one frequency at the ring electrode and at a second frequency at the tip electrode), though in other examples, stimulation signals are only generated by the stylus at one frequency. In some examples, information, such as information about stylus stimulation frequencies and scan event plans, can be transmitted from touch ASIC 201 to the wireless communication unit of computing system 200 via host processor 228. In other examples, information, such as clock synchronization information, can be communicated directly from touch ASIC 201 to wireless communication unit of computing system 200.

In some examples, stylus 500 can operate asynchronously from the computing system 200. In an asynchronous example, the stylus can continuously generate stimulation signals, generate stimulation signals at various intervals, or generate stimulation signals when force is detected by the force sensor 508. In other examples, wireless communication can be used to synchronize the stylus 500 and computing system 200. For example, the stylus 500 can receive clock synchronization information and scan plans from computing system 200 such that it can generate stimulation signals when the computing system expects such stimulation signals from the stylus. For example, the clock synchronization information can provide an updated value for the stylus clock (e.g., a timer, counter, etc.) or reset the stylus clock so that the stylus clock can be substantially the same as (or otherwise track) a system clock for the touch-sensitive device. The stylus can then use the scan plan, which can define the sequence of scan events to be performed by the touch-sensitive device at specific times, and the stylus clock to determine when the touch-sensitive device expects stylus stimulation signals to be generated. When the computing system 200 is not expecting stylus stimulation signals, the stylus can stop generating stimulation signals. Additionally, in some examples, the computing system 200 and stylus 500 can synchronize their communication to regular time intervals such that both the computing system 200 and stylus 500 can save power. For example, after the stylus and computing system pair via a wireless communication channel, the communication between the stylus and computing system can occur only at specified times (based on their respective synchronized clocks). Stylus 500 and/or computing system 200 can include one or more crystals to generate stable and accurate clock signals to improve synchronization and reduce drift between the computing system and stylus clocks.

Figure 6:
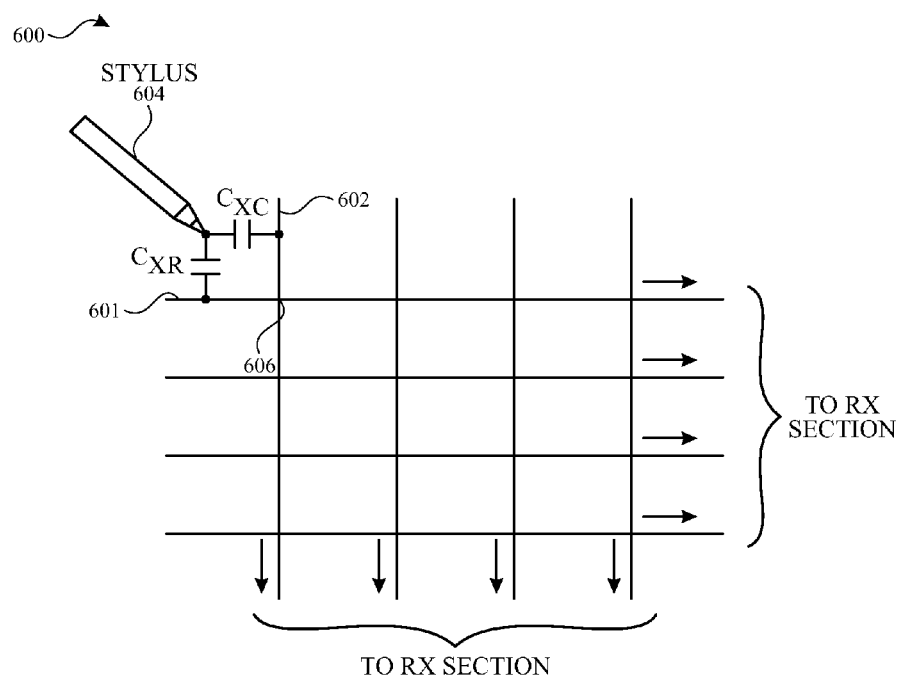
FIG. 6 illustrates an example touch sensor panel configuration operable with the touch ASIC of FIG. 2 to perform a stylus scan according to examples of the disclosure.

FIG. 6 illustrates an example touch sensor panel configuration operable with the touch ASIC of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the transmit section 214 can be disabled, i.e., no stimulation signals Vstim from the touch controller are sent to touch sensor panel 600. The capacitive coupling (e.g., mutual capacitance) can be received by the receive section 208 from the row and column traces of the one or more touch nodes 606 for processing. As described herein, in some examples the one or more stylus stimulation signals can have one or more frequencies. The one or more frequencies can be selected by the touch ASIC 201 using information from a stylus spectral analysis scan (described below in more detail). This frequency information can be wirelessly communicated to the stylus 604 so that the stylus 604 can generate stimulation signals at the appropriate frequencies.

In some examples, one or more multiplexers can be used to couple row and/or column electrodes to the receive section and/or transmit section. For example, during a mutual capacitance touch sensing scan, row traces can be coupled to the transmit section and column traces can be coupled to the receive section. During a stylus sensing scan, column traces (or row traces) can be coupled via the one or more multiplexers to the receive section to detect input from a stylus or other input device along one axis of the touch screen, and then the row traces (or column traces) can be coupled via the one or more multiplexers to the receive section to detect input from a stylus or other input device along a second axis of the touch screen. In some examples, the row and column traces can be sensed simultaneously. In some examples, the stylus can be detected on the column traces concurrently with the mutual capacitance scan touch sensing scan. The touch and stylus signals can be differentiated by filtering and demodulating the received response signals at different frequencies.

Figure 7:
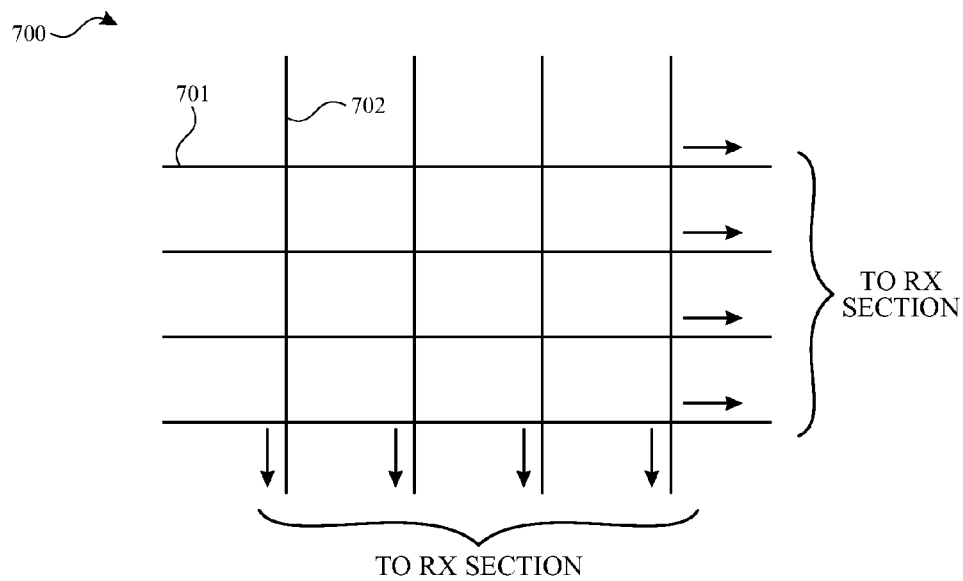
FIG. 7 illustrates an example touch sensor panel configuration operable with the touch ASIC of FIG. 2 to perform a stylus spectral analysis scan according to examples of the disclosure.

FIG. 7 illustrates an example touch sensor panel configuration operable with the touch ASIC of FIG. 2 to perform a stylus spectral analysis scan according to examples of the disclosure. During a stylus spectral analysis scan or a touch spectral analysis scan, the transmit section 214 can be disabled, i.e., no stimulation signals Vstim are sent to touch sensor panel 700, while some or all of the row traces 701 and column traces 702 can be coupled to the receive section 208. The receive section 208 can receive and process touch signals from some or all of the rows and columns of the touch sensor panel 700 in order to determine one or more low noise frequencies for use during subsequent touch and/or stylus scans.

When the stylus 500 first connects or reconnects wirelessly to the computing system 200 it can receive frequency information from the computing system 200. A stylus spectral analysis scan can determine one or more clean frequencies for the stylus to use to generate one or more stimulation signals. The computing system 200 and stylus 500 can communicate (including, for example, performing a handshake between the two devices) and computing system 200 can transmit the frequency information to the stylus 500 such that the stylus knows the appropriate one or more frequencies to use to generate one or more stimulation signals.

The stylus 500 can change at least one stimulation frequency as a result of a stylus spectral analysis scan. In a synchronous system, a stylus spectral analysis scan can execute while the stylus 500 is predicted to not be generating a stimulation signal, e.g., when a stylus scan is not executing. After completing the stylus spectral analysis scan, the frequency information can be communicated wirelessly to stylus 500 and the communication can cause the stylus 500 to change the one or more stimulation frequencies. The computing system 200 can then switch the one or more frequencies used for demodulating stylus scan events when the stylus 500 has switched frequencies.

In other examples, stylus 500 can be asynchronous such that the stylus 500 can generate one or more stimulation signals at one or more stimulation frequencies irrespective of the timing of the stylus scan event. As a result, the stylus 500 can be stimulating the touch sensor panel during the stylus spectral analysis scan. The asynchronous stylus stimulation signals can cause the computing system to detect a signal when demodulating at the frequency of stimulation, which can be interpreted as noise at that frequency and trigger a frequency switch. In order to prevent triggering an unnecessary frequency switch, the computing system 200 can assume that stylus lift-off will eventually occur and wait until lift-off to initiate a stylus spectral analysis scan. The computing system 200 can predict a lift-off condition using the results of other scans, e.g., stylus scans, or stylus force information to predict that the stylus is not on the panel, and then perform a stylus spectral analysis scan.

The performance of location detection algorithms (i.e., detecting position or coordinates of the stylus on the touch-sensitive device), such as a centroid algorithm, for example, can depend on the signal profile received from the active stylus. The signal profile can depend on the electric fields generated between the stylus tip electrode and the sensors of the touch-sensitive device. The electric fields generated between the stylus tip electrode and the sensors of the touch-sensitive device can be dependent on various factors, including the geometry of the stylus tip electrode and the orientation of the stylus tip electrode with respect to the surface of the touch-sensitive device (e.g., tilt angle and azimuth angle).

Figure 8A:
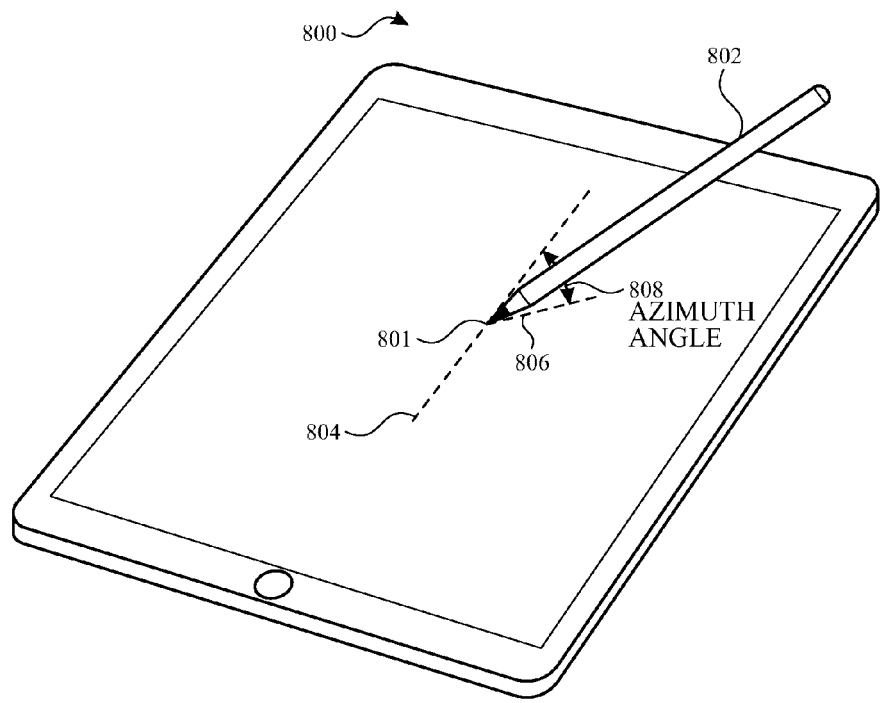
FIGS. 8A and 8B illustrate an azimuth angle and a tilt angle, respectively, for an example stylus and example touch-sensitive device according to examples of the disclosure.
Figure 8B:
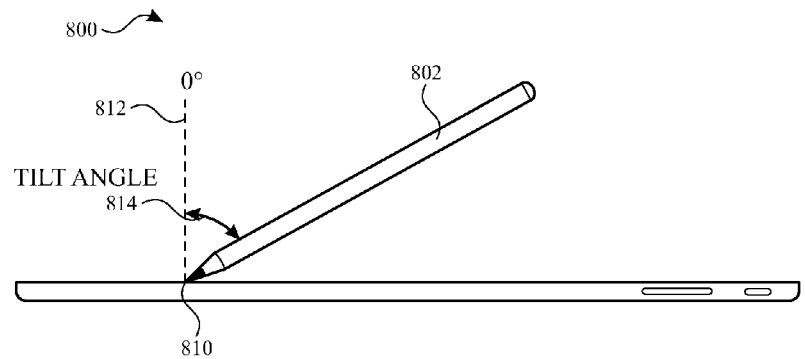

FIGS. 8A and 8B illustrate an azimuth angle and a tilt angle, respectively, for an example stylus and example touch-sensitive device according to examples of the disclosure. FIG. 8A illustrates an example stylus 802 contacting an example touch sensor panel 800 at point 801. Line 804 illustrated in FIG. 8A can represent a reference vector in the plane of touch sensor panel 800 and passing through point 801. Line 806 can represent a projection vector projecting the stylus onto the plane of the touch sensor panel 800. The angle 808 formed between the projection vector (line 806) and reference vector (line 804) can be referred to as the azimuth angle. FIG. 8B illustrates the example stylus 802 contacting the example touch sensor panel 800 at point 810. Line 812 illustrated in FIG. 8B can represent a perpendicular reference vector perpendicular to the plane of touch sensor panel 800 and passing through point 810. The angle 814 formed between the reference vector (line 812) and stylus 802 can be referred to as the tilt angle.

Figures 9A, 9B:
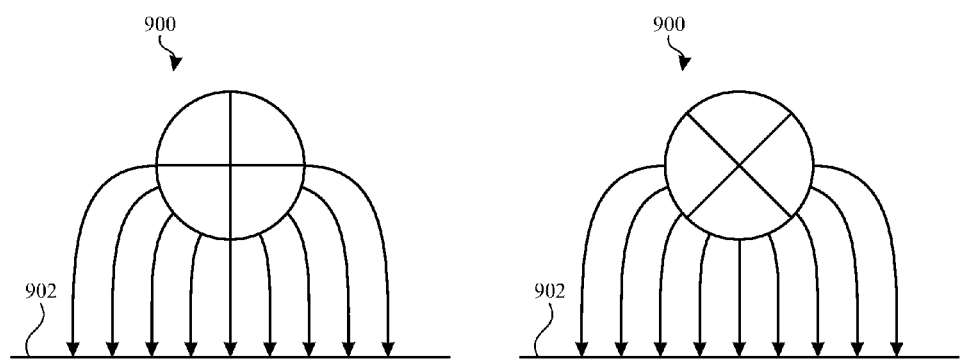
FIGS. 9A and 9B illustrate example electric fields for an example spherical tip electrode in different orientations according to examples of the disclosure.

A perfect spherical tip electrode provided at the tip of the stylus can generate a uniform electric field irrespective of the orientation of the stylus. FIGS. 9A and 9B illustrate example electric fields for an example spherical tip electrode in different orientations according to examples of the disclosure. FIG. 9A illustrates example spherical tip electrode 900 proximate to or contacting the surface of a touch-sensitive device in a first orientation (e.g., 0° tilt). Stimulation signals generated by stimulation circuitry of an active stylus can create an electric field between the spherical tip electrode 900 and a sensor electrode 902 of the touch-sensitive device. FIG. 9B illustrates the example spherical tip electrode 900 proximate to or contacting the surface of a touch-sensitive device in a second orientation (e.g., 45° tilt). Stimulation signals generated by stimulation circuitry of an active stylus can create an electric field between the spherical tip electrode 900 and a sensor electrode 902 of the touch-sensitive device that is the same as the electric field generated in the first orientation. Thus, irrespective of the orientation of the active stylus with respect to sensor electrode 902, spherical tip electrode 900 can form the same electric field with respect to sensor electrode 902. As a result, irrespective of the orientation of the active stylus, the location detection algorithms should exhibit the same wobble characteristic when using a spherical electrode.

Figure 16:
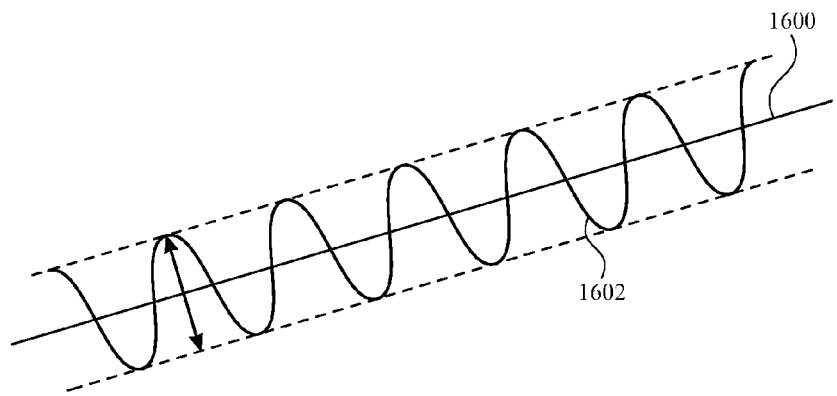
FIG. 16 illustrates an example wobble according to examples of the disclosure.

Wobble can be a metric to measure accuracy of location detection by measuring the difference between a detected location and an actual location. For example, when drawing a line diagonally across a touch sensor panel, rather than generating a straight line, the detected input can include an oscillating curve in the direction of the line due to errors between the detected location of the stylus tip and the actual position of the stylus tip. Wobble can be a measure of the absolute amplitude or peak-to-peak amplitude of the oscillating curve (i.e., corresponding to the maximum location error). FIG. 16 illustrates an example wobble according to examples of the disclosure. FIG. 16 illustrates line 1600 drawn diagonally across a surface of a touch screen, for example. Rather than detecting and display a straight line, however, the location detection algorithms can detect and display an oscillating curve 1602 that can follow the path of line 1600. The peak-to-peak amplitude of the oscillating curve 1602 can be a measure of wobble indicative of the accuracy of location detection.

A non-spherical tip electrode (e.g., due to imperfections in the geometry), however, can generate a non-uniform electric field that can vary depending on the orientation of the stylus tip electrode. The non-uniform electric field can cause errors in the location detection algorithms, which can manifest as orientation dependent (e.g., tilt-dependent) wobble. In other words, depending on the orientation of the stylus, the performance of the stylus location detection can change. Given that styli can be used at varying angles (e.g., typically between 20° and 70°), orientation or tilt-dependent performance can limit the effectiveness of the stylus as an input device.

In some examples, a stylus tip electrode can be a sphere and the stylus tip electrode can be stimulated via a capacitive or inductive coupling between the stylus stimulation circuitry and the stylus tip electrode. Capacitively or inductively coupling signals to the stylus tip electrode, however, can be inefficient and can require significant power to meet other performance criteria. Thus, relying on capacitive or inductive coupling between the stylus tip electrode and stylus stimulation circuitry can quickly drain the battery.

In other examples, the stylus tip electrode can be stimulated via a physical coupling between stylus stimulation circuitry generating stimulation signals and the stylus tip electrode. However, reliable physical coupling to a spherical electrode can be difficult. In order to make reliable and secure physical contact, the tip electrode can be designed to include a feeding portion (e.g., a feeding rod or other projection). In practice, a stylus tip electrode formed as a perfect sphere with a feeding rod or other projection can be difficult to obtain. A spherical tip electrode geometry can be difficult to obtain due to manufacturing limitations or other physical constraints of the stylus design.

Figure 10A:
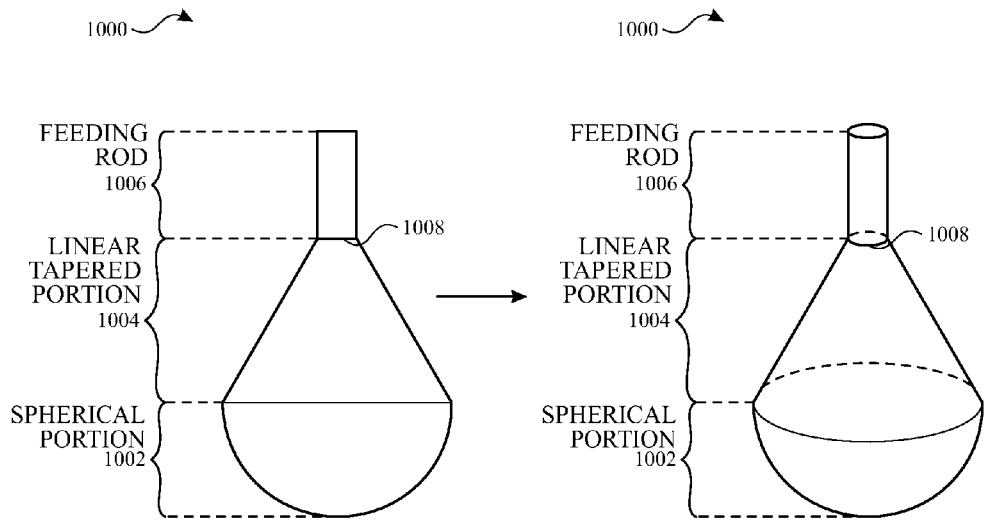
FIG. 10A illustrates an example stylus tip electrode according to examples of the disclosure.

Nonetheless, the stylus tip electrode can be constructed with a spherical portion to leverage properties of the ideal spherical electrode. For example, the stylus tip electrode can have a spheroid shape, a trilobe shape or an ellipsoid shape. FIG. 10A illustrates an example stylus tip electrode according to examples of the disclosure. Example electrode 1000 can include a spherical portion 1002 at its distal end. The spherical portion can be a half-sphere, for example, or some other portion of a sphere. The electrode can also include a feeding rod portion 1006 at its proximal end. The feeding rod portion can be a cylindrical shape, for example, although other shapes are possible. The feeding rod portion can be a conduit for coupling electrode 1000 to the stylus stimulation circuitry (not shown). The region between the spherical portion 1002 and the feeding rod portion 1006 can be designed to improve performance (e.g., manifested as reduced tilt-dependent wobble). This region can be referred to herein as the taper portion. In FIG. 10A, for example, the electrode 1000 can also include a linear taper portion 1004, in which the electrode can linearly taper between the spherical portion 1002 and feeding rod portion 1006. The linear taper portion 1004 can be a conic shape, for example, with a two dimensional cross-section illustrated in FIG. 10A showing a linear taper. Although described as including different portions, the electrode can be formed as a single electrode structure (rather than as separate elements integrated together).

In some examples, the feeding rod portion can be part of the stylus tip electrode. In other examples, the linear taper portion 1004 can linearly taper away from the spherical portion up until line 1008, such that the tip electrode can include a spherical portion 1002 and linear taper portion 1004 without feeding rod portion 1006. In the two dimensional cross-section illustrate in FIG. 10A, the linear taper portion 1004 can have a trapezoidal shape with an upper base represented by line 1008. In the latter example, feeding rod portion 1006 can represent a conductor (e.g., a printed circuit board conductor) or other coupling mechanism between the stylus stimulation circuitry and the stylus tip electrode.

The spherical portion of a stylus tip electrode can be formed from a conductive material such as a metal, alloy, conducting plastic or combination thereof. The spherical portion can be solid or can be a surface with hollow portions inside. Additionally, although the stylus tip electrode is discussed herein as having a spherical shape, in other examples the shape can be a spheroid, ellipsoid, parabolic hyperboloid, or other shape.

Figure 10B:
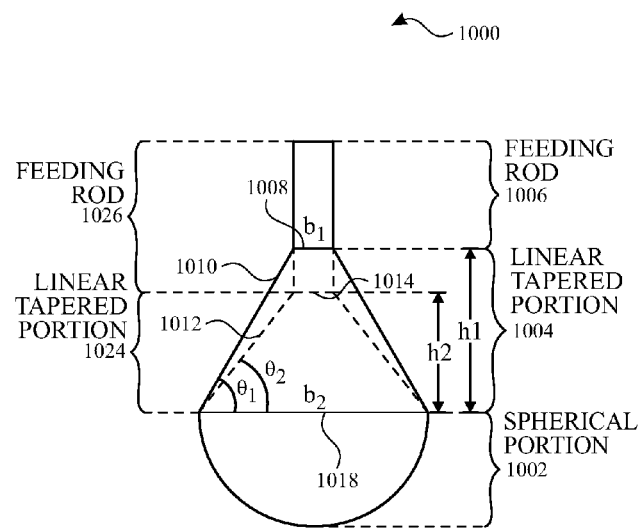
FIG. 10B illustrates angle variation (or height variation) for an example stylus tip electrode according to examples of the disclosure.

Various parameters of the linear taper portion can be selected to optimize the design of the electrode for a stylus and sensors of a corresponding touch-sensitive device. FIG. 10B illustrates angle variation (or height variation) for an example stylus tip electrode according to examples of the disclosure. Example electrode 1000 can include a spherical portion 1002 at its distal end and can include a feeding rod portion 1006 at its proximal end. The electrode 1000 can also include a linear taper portion 1004 between the spherical portion 1002 and feeding rod portion 1006. The linear taper portion can be parameterized by an angle variation parameter "θ" defined by the mathematical expression:

$$\theta = \tan^{-1} \frac{h}{\frac{1}{2}|b_1 - b_2|},$$

where "h" can represent the vertical length between the boundary of the spherical portion 1002 and boundary of the feeding rod portion 1006, $b_1$ can represent the lower base of the trapezoidal shape of the two dimensional cross-section of the linear taper region (e.g., lower base 1018 in FIG. 10B), and $b_2$ can represent the upper base of the trapezoidal shape of the two dimensional cross-section of the linear taper region (e.g., upper base represented by line 1008). For a fixed $b_1$ and $b_2$, the taper angle θ can be varied by varying the height of the linear taper region, providing for adjusting the taper region using a height variation parameter ("h").

FIG. 10B illustrates two exemplary variations for the stylus tip electrode 1000. The first example linear taper portion 1004 in FIG. 10B can correspond to the two-dimensional trapezoid having a taper portion height $h_1$, lower base 1018 and first upper base represented by line 1008. The taper angle between linear segment 1010 (illustrating the linear taper) and lower base 1018 can be $\theta_1$. Linear taper portion 1004 can couple to feeding rod portion 1006 at line 1008. The second example linear taper portion 1024 in FIG. 10B can correspond to the two-dimensional trapezoid having a taper portion height $h_2$, lower base 1018 and second upper base represented by line 1014. The taper angle between linear segment 1012 (illustrating the linear taper) and lower base 1018 can be $\theta_2$. Linear taper portion 1024 can couple to feeding rod portion 1026 at line 1014.

In the examples illustrated in FIG. 10B, the first upper base represented by line 1008 and second upper base represented by line 1014, respectively, can have the same dimensions and, as a result, the taper angle $\theta_1$ corresponding linear taper portion 1004 can be larger than the taper angle $\theta_2$ corresponding to linear taper portion 1024. The feeding rod portion (whether part of the electrode or used for coupling to the electrode) can be increased as the linear taper region height decreases to couple to the linear taper portion of the electrode. For example, the feeding rod portion 1026 corresponding to height $h_2$ can be longer than the feeding rod portion 1006 corresponding to height $h_1$.

Figure 17A:
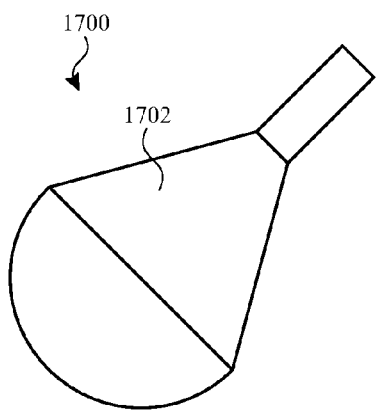
FIGS. 17A-C can represent example electrodes with different linear taper angles according to examples of the disclosure.
Figure 17B:
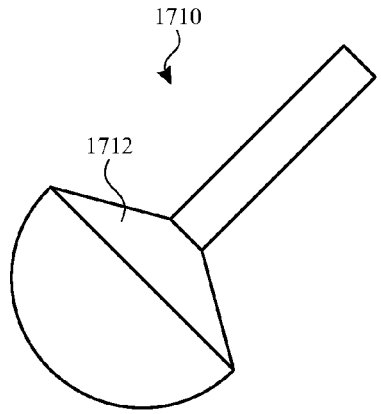
Figure 17C:
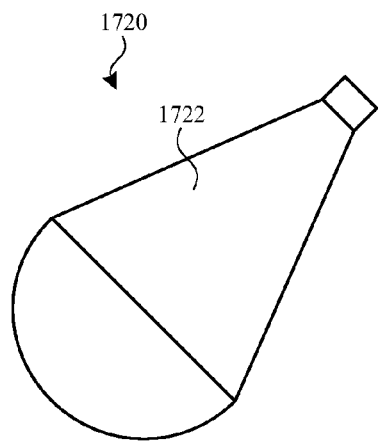

Wobble (across different tilt angles) can be used as a figure of merit to compare performance when varying the taper angle of the linear taper portion. Assuming other parameters are maintained, as "h" decreases from the optimal value (as θ goes to) 0° and as "h" increases from the optimal value for the stylus (as θ goes to a maximum angle), the measured wobble can be greater than the wobble at the optimal value. FIGS. 17A-C can represent example electrodes with different linear taper angles according to examples of the disclosure. Each electrode in FIGS. 17A-C is illustrated with 45° tilt angle. Electrode 1700 in FIG. 17A can correspond to the electrode illustrated in FIG. 10A. Electrode 1700 can include a linear taper portion 1702 that can be optimized for the given application (e.g., stylus and sensor combination). FIG. 17B illustrates electrode 1710 with a linear taper portion 1712 having a smaller height and angle than linear taper portion 1702 of electrode 1700. As the height or angle of the linear taper portion decreases from an optimal value (or high performance value), when the stylus tilts there can be a drop off in electric field magnitude (discontinuity) due to change in geometry of the electrode proximate to the sensor. For example, the spherical portion of the electrode can be proximate to the sensor at 0° tilt, but at 45° tilt, less of the spherical portion of the electrode can be proximate to the sensor and instead part of the linear taper portion (and to a lesser extent the feeding rod) can be proximate to the sensor. Due to the geometric differences (i.e., less electrode coupling from the linear taper portion than needed to offset the reduced coupling from the spherical portion), amplified by the small taper angle, the electric field properties can be different and therefore more wobble can be measured as the stylus tilts. FIG. 17C illustrates electrode 1720 with a linear taper portion 1722 having a larger height and angle than linear taper portion 1702 of electrode 1700. As the height or angle of the linear taper portion increases from an optimal value (or high performance value), when the stylus tilts there can be an desired increase in electric field magnitude due to change in geometry of the electrode proximate to the sensor. For example, the spherical portion of the electrode can be proximate to the sensor at 0° tilt, but at 45° tilt, less of the spherical portion of the electrode can be proximate to the sensor and instead more of the linear taper portion (and to a lesser extent the feeding rod) can be proximate to the sensor. Due to the geometric differences (i.e., more electrode coupling from the linear taper portion than offset by the reduced coupling from the spherical portion), amplified by the larger taper angle, the electric field properties can be different and therefore more wobble can be measured as the stylus tilts. Although discussed in terms of optimal values, there can be more than one optimal value or a range of values that can be used for optimizing linear tapering. The optimal value or range of values can exhibit lower variations in wobble across different tilt angles of operation.

Figure 10C:
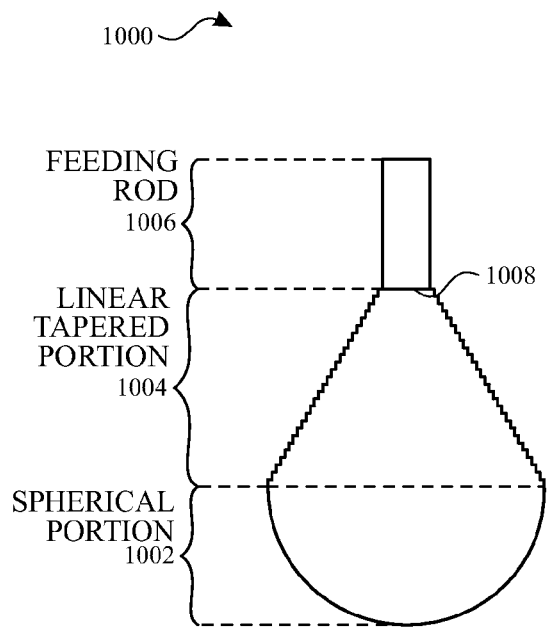
FIG. 10C illustrates an example stylus tip electrode approximating a linear taper according to examples of the disclosure.

In some examples, the linear taper portion can approximate a linear taper rather than be strictly linear. FIG. 10C illustrates an example stylus tip electrode approximating a linear taper according to examples of the disclosure. Example electrode 1000 can include a spherical portion 1002 at its distal end and can include a feeding rod portion 1006 at its proximal end. The electrode 1000 can also include a linear taper portion 1004 between the spherical portion 1002 and feeding rod portion 1006. The linear taper region can taper to approximate a linear taper. For example, FIG. 10C illustrates a taper formed of small steps (in the two-dimensional cross-section view) that approximate a line. In some examples, the steps can be uniform for the entire linear taper portion 1004. In other examples, some or all of the steps can be different sizes. In some examples, the taper can be linear in some portions and include steps approximating linear behavior at other portions of the taper. Additionally, although FIG. 10C illustrates steps approximating linear behavior, in other examples, the taper can include linear and/or non-linear portions that approximate a linear taper.

Figure 10D:
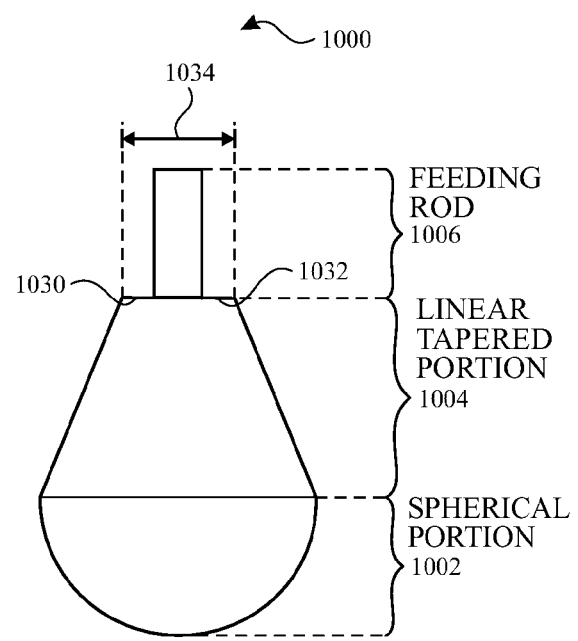
FIG. 10D illustrates an example stylus tip electrode with a shoulder according to examples of the disclosure.

In some examples, the stylus tip electrode can include a shoulder at the coupling point between the linear taper portion 1004 and the feeding rod portion 1006. FIG. 10D illustrates an example stylus tip electrode with a shoulder according to examples of the disclosure. Rather than tapering the stylus tip electrode to the width of the feeding rod portion (i.e., the diameter of a cylindrical feeding rod), the electrode can be tapered to a width, represented by arrow 1034, that can be greater than the width of the feeding rod portion. The difference in width at the juncture of the linear taper portion 1004 and the feeding rod portion 1006 can form shoulders 1030 and 1032. As the shoulder increases in size, the increase in conductive material can result in increased tilt-dependent wobble when compared with an electrode having no shoulder. As discussed with reference to FIG. 17C, the geometric differences (i.e., more electrode coupling from the linear taper portion than offset by the reduced coupling from the spherical portion) can change the electric field properties and therefore more wobble can be measured as the stylus tilts. Reducing the size of the shoulders can reduce wobble and thereby improve the tilt-independence of wobble.

The example electrode 1000 having a spherical portion and a linear taper portion can provide a fairly uniform electric field which can result in relatively tilt-independent wobble performance. It can at least reduce the maximum wobble across various orientation angles. The linear taper can provide a gradual decrease in electrode area proximate to touch sensors as the stylus tile angle increases, and the linear taper can create a continuous drop off in electric field magnitude moving away from the spherical portion of the electrode. The height parameter of the linear taper portion and/or the angle variation parameter can be optimized for a given sensor panel to reduce wobble.

Figure 11A:
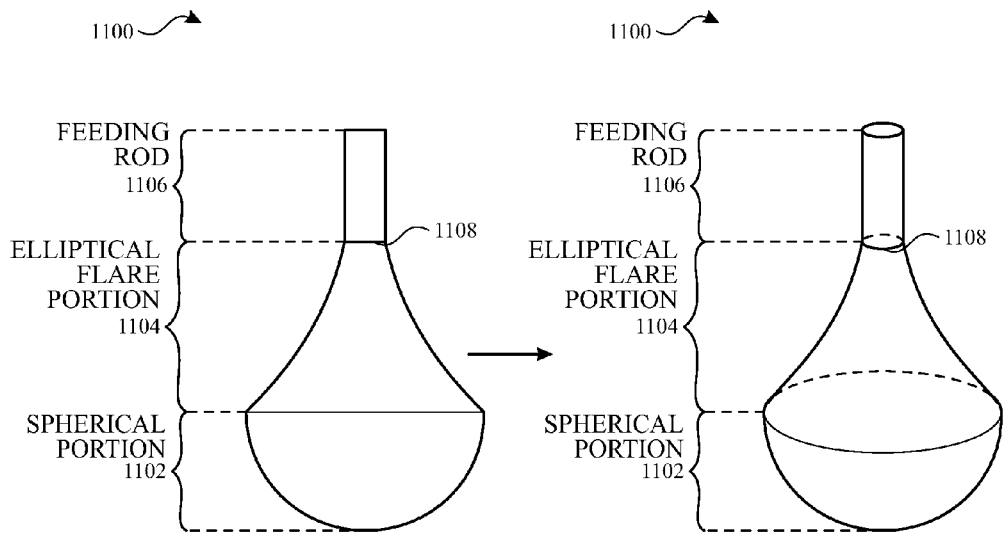
FIG. 11A illustrates an example stylus tip electrode including an elliptical flare according to examples of the disclosure.

Although FIGS. 10A through 10D discuss a linear taper region between the spherical portion and the feeding rod portion, in other examples, the shape of the stylus tip region between the spherical portion and the feeding rod portion can be non-linear (i.e., have a non-linear taper). FIG. 11A illustrates an example stylus tip electrode including an elliptical flare according to examples of the disclosure. Example electrode 1100 can include a spherical portion 1102 at its distal end and can include a feeding rod portion 1106 at its proximal end. The feeding rod portion can be a conduit for coupling electrode 1100 to the stylus stimulation circuitry. The region (i.e., taper portion) between the spherical portion 1102 and the feeding rod portion 1106 can be designed to improve performance (e.g., manifested as reduced tilt-dependent wobble). In FIG. 11A, for example, the electrode 1100 can also include an elliptical flare portion 1104, in which the electrode can non-linearly taper between the spherical portion 1102 and feeding rod portion 1106. The elliptical flare can be formed by the concave elliptical curve leaving the boundary of the spherical portion 1102 in the two-dimensional cross-sectional view illustrated in FIG. 11A. Although described herein as forming an elliptical flare, the tapering can include any non-linear taper for concave curves, convex curves, or a combination thereof. The tapering can also include a mix of linear and non-linear tapering.

The spherical portion can be a half sphere, for example, or a different portion of a sphere. The elliptical taper region can be a conic, horn-like shape, for example. The feeding rod portion can be a cylindrical shape, for example. It should be understood that other shapes for these portions are possible.

In some examples, the feeding rod portion can be part of the stylus tip electrode. In other examples, the elliptical flare portion 1104 can non-linearly taper away from spherical portion 1102 up until line 1108, such that the tip electrode can include a spherical portion 1102 and an elliptical flare portion 1104 having a conic shape. In the latter example, feeding rod portion 1106 can represent a conductor (e.g., a circuit board connector) or other coupling mechanism between the stylus stimulation circuitry and the stylus tip electrode.

Figure 11B:
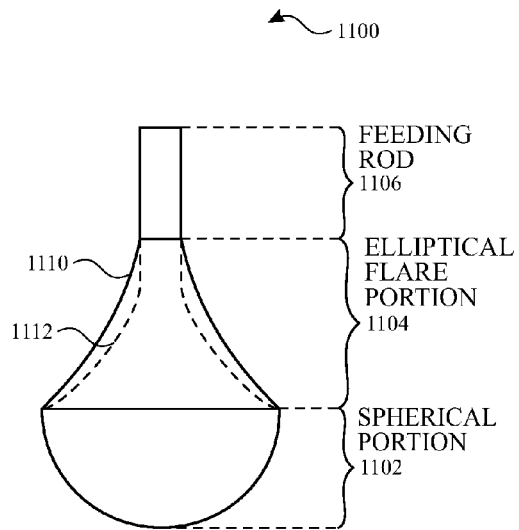
FIG. 11B illustrates curvature variation for an example stylus tip electrode according to examples of the disclosure.

Various parameters of the elliptical taper portion can be selected to optimize the design of the electrode for a stylus and sensors of a corresponding touch-sensitive device. FIG. 11B illustrates curvature variation for an example stylus tip electrode according to examples of the disclosure. Example electrode 1100 can include a spherical portion 1102 at its distal end and can include a feeding rod portion 1106 at its proximal end. The electrode 1100 can also include an elliptical flare portion 1104 between the spherical portion 1102 and feeding rod portion 1106. FIG. 11B illustrates two exemplary curvature variations for the stylus tip electrode 1100 represented by non-linear segments 1110 and 1112. In some examples, the elliptical flare portion can also include a combination of linear and non-linear tapering.

Figure 11C:
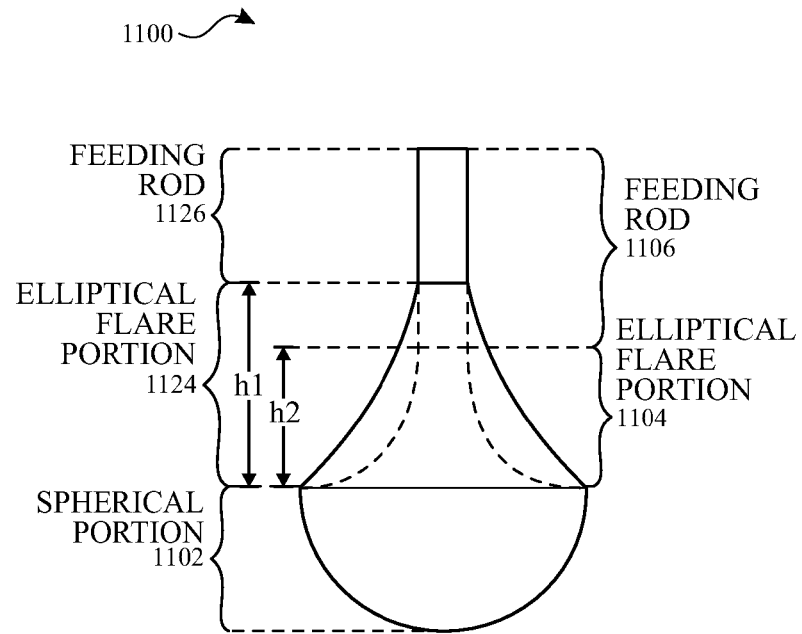
FIG. 11C illustrates height variation for an example stylus tip electrode according to examples of the disclosure.

In some examples, the height of the elliptical flare region can be varied to optimize the design of the electrode for a stylus and sensors of a corresponding touch-sensitive device. FIG. 11C illustrates height variation for an example stylus tip electrode according to examples of the disclosure. Example electrode 1100 can include a spherical portion 1102 at its distal end and can include a feeding rod portion 1106 at its proximal end. The electrode 1100 can also include an elliptical flare portion 1104 between the spherical portion 1102 and feeding rod portion 1106. The elliptical flare region can be parameterized by a height variation parameter ("h"), which can represent the vertical length of the elliptical flare region.

FIG. 11C illustrates two exemplary heights for the stylus tip electrode 1100. An electrode can have an elliptical flare region height of $h_1$, for example, which can have a corresponding curvature. Alternatively, the electrode can have an elliptical flare region height of $h_2$, for example, which can have a different corresponding curvature. The feeding rod portion can be increased as the elliptical flare region height decreases to couple to the elliptical flare portion of the electrode. For example, the feeding rod portion 1126 corresponding to height $h_2$ can be longer than the feeding rod portion 1106 corresponding to height $h_1$.

Figure 11D:
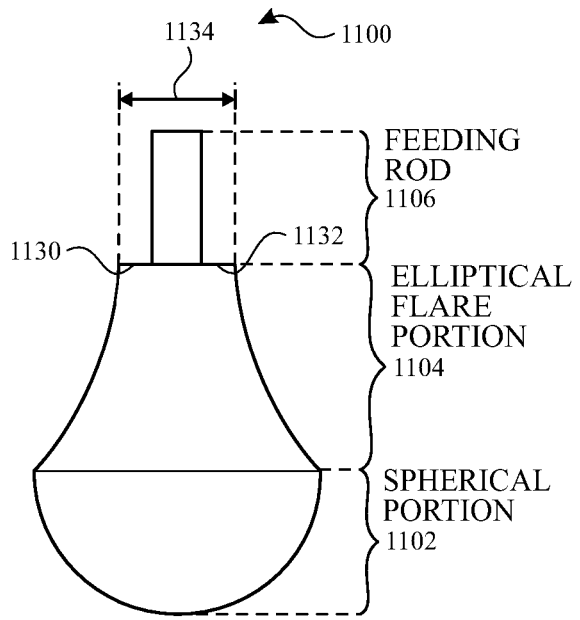
FIG. 11D illustrates an example stylus tip electrode with a shoulder according to examples of the disclosure.

In some examples, the stylus tip electrode can include a shoulder at the coupling point between the elliptical flare portion 1104 and the feeding rod portion 1106. FIG. 11D illustrates another example stylus tip electrode with a shoulder according to examples of the disclosure. Rather than tapering the stylus tip electrode to the width of the feeding rod portion (i.e., the diameter of a cylindrical feeding rod), the electrode can be tapered to a width, represented by arrow 1134, that can be greater than the width of the feeding rod portion, forming shoulders 1130 and 1132.

The example electrode 1100 can provide a fairly uniform electric field which can result in relatively tilt-independent wobble performance. It can at least reduce the maximum wobble across various orientation angles. The elliptical flare (i.e., concave) can provide a decrease in electrode area proximate to touch sensors as the stylus tile angle increases (even faster than a linear taper). The elliptical flare, however, can create a discontinuous drop off in electric field at the boundary of the spherical portion and the elliptical flare region that can degrade the performance of location detection algorithms as compared with a linear taper. The height parameter of the elliptical flare portion and/or the curvature parameter can be optimized for a given sensor panel to reduce wobble across applicable tilt angles.

Figure 12A:
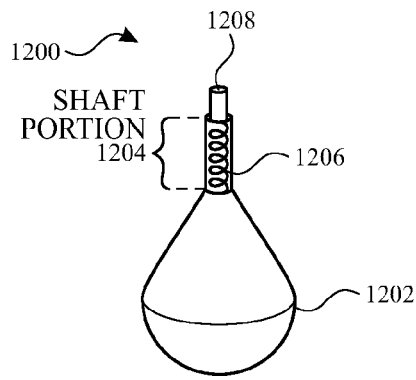
FIG. 12A illustrates an example electrode including a spring-loaded contact device according to examples of the disclosure.

In some examples, some or the entire stylus tip electrode can be formed as a spring-loaded contact device (spring-loaded contact member), like a pogo pin, to ensure a secure connection between the stylus electrode tip and the stylus stimulation circuitry. FIG. 12A illustrates an example electrode including a spring-loaded contact device according to examples of the disclosure. Example electrode 1200 can include a spherical portion 1202 (e.g., a full or partial sphere) and a shaft portion 1204. The shaft portion 1204 can include one or more spring-loaded electrodes, represented in FIG. 12A by spring 1206 and pin 1208. Within the body of shaft portion 1204, pin 1208 can make electrical contact with the shaft and/or spherical portions to form a good conduit for transmitting stylus stimulation signals to the stylus tip electrode. The spring-loaded contact device can ensure secure contact between the electrode 1200 and the stylus stimulation circuitry.

Figure 12B:
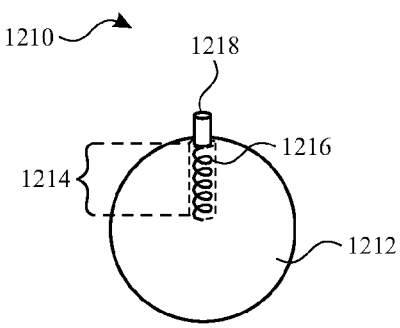
FIG. 12B illustrates another example electrode including a spring-loaded contact device according to examples of the disclosure.

FIG. 12B illustrates another example electrode including a spring-loaded contact device according to examples of the disclosure. Example electrode 1210 can include a spherical portion 1212, which can be a solid sphere, for example, with a shaft portion 1214 inside the body of the spherical portion. For example, the solid sphere electrode can be milled to create a hollow shaft into which a spring-loaded electrode, represented in FIG. 12B by spring 1216 and pin 1218, can be inserted. Within the shaft portion 1214, pin 1218 can make electrical contact with the shaft/spherical portion to form a good conduit for transmitting stylus stimulation signals to the stylus tip electrode. The spring-loaded contact device can ensure secure contact between the electrode 1210 and the stylus stimulation circuitry. Although illustrated in FIG. 12B as a spherical electrode, the spring-loaded contact device can be included in any of the electrodes described herein.

Figure 13A:
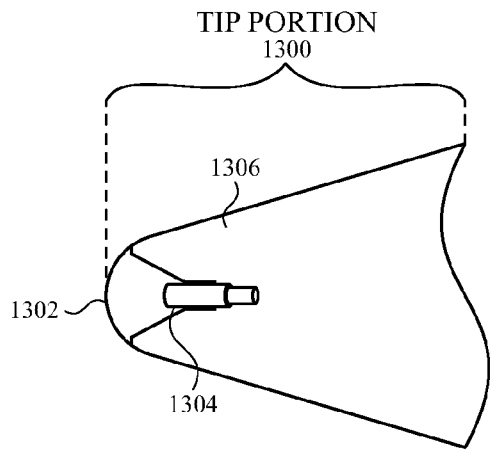
FIG. 13A illustrates an example stylus tip portion including a stylus tip electrode according to examples of the disclosure.

The electrodes discussed herein can be incorporated as stylus tip electrodes into the tip portion of the stylus. FIG. 13A illustrates an example stylus tip portion including a stylus tip electrode according to examples of the disclosure. The stylus tip portion 1300 can include a tip electrode 1302 formed from a conductive material and a spring-loaded contact device 1304. The conductive material of tip electrode 1302 can be any suitable conductor, including, for example, a conductive plastic. Using a conductive plastic for the tip electrode at the tip of the stylus tip portion can be beneficial when interacting with touch screens which can be scratched when using a metallic tipped input device, for example. The spring-loaded contact device 1304 can couple the tip electrode 1302 to the rest of the stylus stimulation circuitry (not shown). For example, spring-loaded contact device 1304 can be a metallic pogo pin. The stylus tip can include a non-conductive material 1306, such as non-conductive plastic, around the conductive stylus tip electrode 1302. In some examples, the spring-loaded contact device 1304 can be press-fit into an opening in stylus tip electrode 1302. In other examples, the spring-loaded contact device 1304 can be over-molded with conducting material forming the stylus tip electrode 1302.

Figure 13B:
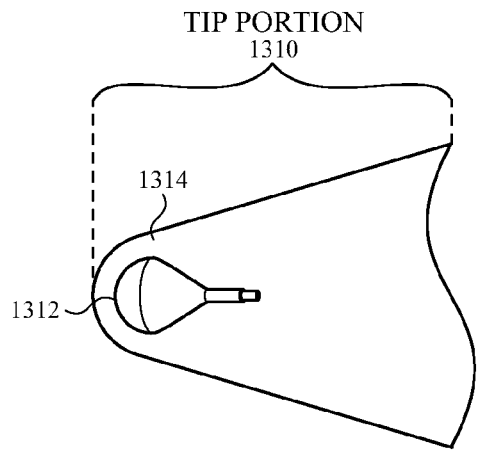
FIG. 13B illustrates another example stylus tip portion including a stylus tip electrode according to examples of the disclosure.

FIG. 13B illustrates another example stylus tip portion including a stylus tip electrode according to examples of the disclosure. The stylus tip portion 1310 can include a tip electrode 1312 formed from a conductive material, such as a metal, alloy, conductive plastic, or other suitable material. Tip electrode 1312 can include a spherical portion, a tapered portion, and a spring-loaded contact device. The spring-loaded contact device can couple the tip electrode 1312 to the rest of the stylus stimulation circuitry (not shown). The stylus tip can include a non-conductive material 1314, such as non-conductive plastic, around the conductive stylus tip electrode 1312. The non-conductive plastic or other material can be flexible and soft so as to limit or prevent scratching of a touch screen of a touch-sensitive device. The non-conductive material can also be selected to have a dielectric constant (e.g., with respect to air) that can enhance or focus or shape the electric field formed between the tip electrode and the sensors of a touch-sensitive device, or otherwise limit the attenuation of the electric field. The tapering of the tapered portion can be designed to account for the electric field changes due to the dielectric material around the stylus tip electrode. Additionally, the non-conducting material can create greater distance between the stylus tip electrode that can improve wobble performance because the taper portions and feeding portions can be further removed from the near-field coupling of the touch sensor. In some examples, the tip electrode 1312 can be press-fit into an opening in the non-conductive material 1314. In other examples, the tip electrode 1312 can be over-molded with non-conductive material 1314 forming the stylus tip portion.

Figure 13C:
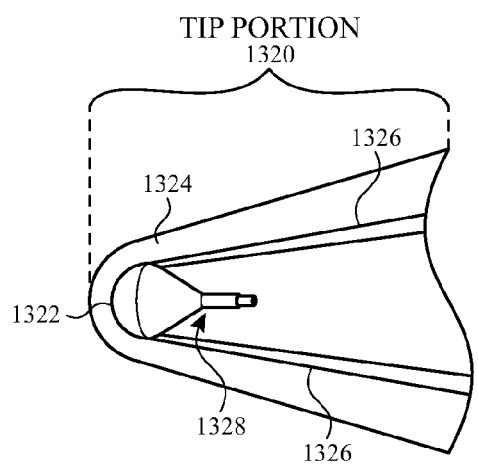
FIG. 13C illustrates another example stylus tip portion including a stylus tip electrode according to examples of the disclosure.

FIG. 13C illustrates another example stylus tip portion including a stylus tip electrode according to examples of the disclosure. The stylus tip portion 1320 can include a tip electrode 1322 formed from a conductive material, such as a metal, alloy, conductive plastic, or other suitable material. Tip electrode 1322 can include a spherical portion and a tapered portion, for example, as illustrated in FIG. 10A, and a spring-loaded contact device. The spring-loaded contact device can couple the tip electrode 1322 to the rest of the stylus stimulation circuitry (not shown). The stylus tip can include a non-conductive material 1324, such as non-conductive plastic, around at least part of the conductive stylus tip electrode 1322. For example, the non-conductive material 1324 can border some or all of the spherical portion of tip electrode 1322. The non-conductive plastic or other material can be flexible and soft so as to limit or prevent scratching of a touch screen of a touch-sensitive device. The non-conductive plastic can also be selected to have a dielectric constant that can enhance or focus or shape the electric field formed between the tip electrode and the sensors of a touch-sensitive device, or otherwise limit the attenuation of the electric field. In some examples, the tip electrode 1322 can be press-fit into an opening in the non-conductive material 1324. In other examples, the tip electrode 1322 can be over-molded with non-conductive material 1324 forming the stylus tip portion.

The tip portion 1320 illustrated in FIG. 13C can also include a second non-conductive material 1326 to add stability and structural integrity to the stylus. The soft and/or flexible non-conductive material 1324 can provide benefits such as minimizing or preventing the stylus from scratching the touch screen or other touch-sensitive device that it is used with. However, the soft and/or flexible properties of non-conductive material 1324 can reduce the structural integrity of the stylus. The second non-conductive material 1326 can be a different material than non-conductive material 1324, but can also be a non-conductive plastic. The second non-conductive plastic can begin at the boundary between the spherical portion and the linear taper portion of the stylus tip electrode, for example. In other examples, the second non-conductive material can begin at the taper portion or at the spherical portion. In some examples the second non-conductive material can contact the tip electrode as illustrated in FIG. 13C, but in other examples, the second non-conductive material can be separated from tip electrode 1322. The second non-conductive material can extend back into the tip portion 1320 and, in some examples, can extend beyond tip portion 1320 into the shaft portion of the stylus (not shown). The dielectric properties of the second non-conductive material can be the same or different than the first non-conductive material. In some examples, the dielectric properties can be selected to enable the second non-conductive material to attenuate the electric fields generated from portions of the tip electrode 1322 (i.e., the linear taper portion and feeding rod) that come closer to the touch-sensitive device when used at a large tilt angle. This electric field can be undesired as it can cause error in location detection. The space 1328 between the second non-conductive material and the back end of the tip electrode 1322 (i.e., feeding portions) can be filled with the first non-conductive material, with air, or with a different material. In some examples, there second non-conductive material can contour so as to follow the back end of tip electrode 1322, so as not to form space 1328.

For FIGS. 13B and 13C, which can include a conducting tip electrode with a non-conductive material around some or all of the spherical portion of the conductive tip electrode, the tip portion can be formed to leave no air gap between the tip electrode and non-conductive material. Leaving an air gap can disrupt or reduce the electric field generated by the spherical portion at the tip of the tip electrode due to the dielectric properties of air. Air can act as a poor dielectric which can minimize the electric field from the spherical portion of the tip electrode (desired electric field). In contrast, a non-conductive material can focus and intensify the electric field (at least with respect to air) at the spherical portion of the tip electrode.

Figure 14A:
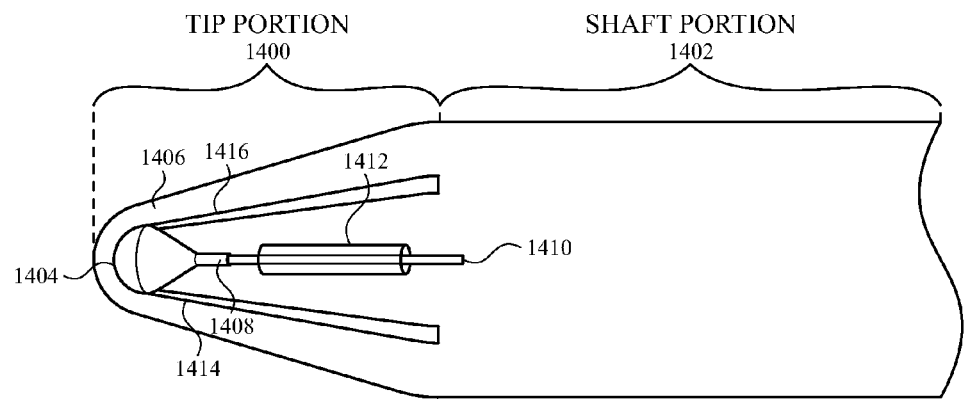
FIG. 14A illustrates an example stylus including a shield according to examples of the disclosure.

In some examples, the stylus can include a shield (e.g., a ground shield) to reduce undesired electrical coupling between the back end of the tip electrode, feeding rod and additional circuitry in the stylus (feeding portions). FIG. 14A illustrates an example stylus including a shield according to examples of the disclosure. The example stylus can include a tip portion 1400 and shaft portion 1402. In some cases the shaft portion 1402 can have a substantially cylindrical shape and the tip portion 1400 can have a substantially conic shape. Tip portion can include a tip electrode 1404, a first non-conductive material 1406 around at least the spherical portion of tip electrode 1404, and a second non-conductive material 1414 as discussed with respect to FIG. 13C. Tip electrode 1404 can include a spring-loaded contact member to couple the tip electrode 1404 to a feeding electrode 1410. Although represented in FIG. 14A with feeding rod 1410, the spring-loaded contact member 1408 can also contact a printed circuit board, wire or other stylus stimulation circuitry. Feeding rod 1410 can generate an electric field that can introduce errors into the location detection algorithm depending on the tilt angle of the stylus. In order to minimize or mitigate the effects of electric fields from the feeding electrode 1410, a portion of the feeding rod portion and/or feeding portions of the electrode 1404 (i.e., distant from the spherical portion), a shield can be added around some feeding portions like a coaxial cable. The shielding can prevent the electric field generated by the feeding portions (e.g., feeding electrode 1410 in FIG. 14A) from coupling to the touch-sensitive device sensors.

The distance between the spherical portion of the tip electrode 1404 and the shield 1412 can be optimized for best performance. For example, placing the shield 1412 too close to the tip electrode 1404 can cause electric field desired to be coupled from the tip electrode to the touch-sensitive device sensors to couple instead to the shield. Placing the shield 1412 too far from tip electrode 1404 can expose more of the feeding portions of tip electrode 1404 and feeding electrode 1410, which can generate undesired electric fields that can interfere with the stylus location detection algorithm.

Additionally or alternatively, as discussed herein, spaces between tip electrode 1404 and the second non-conductive material 1414 can be filled with air (or another material) that can have dielectric properties that can reduce the electric fields associated with the feeding portions of tip electrode 1404 and feeding electrode 1410.

Figure 14B:
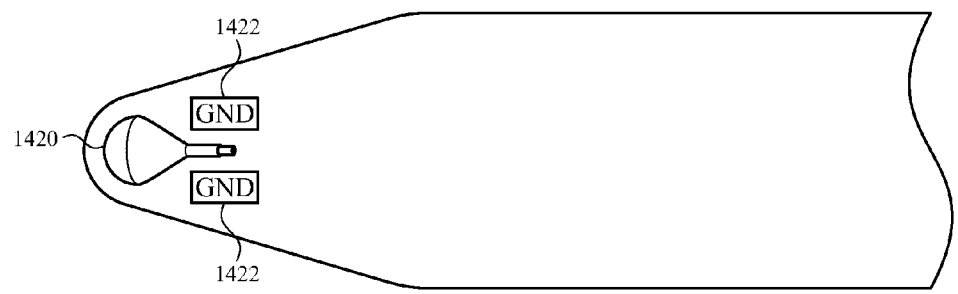
FIG. 14B illustrates an example stylus including ground regions according to examples of the disclosure.

FIG. 14B illustrates an example stylus including ground regions according to examples of the disclosure. Like the example stylus of FIG. 14A, the example stylus of FIG. 14B can include a substantially conic tip portion and substantially cylindrical shaft portion 1402. Tip portion can include a tip electrode 1420. In order to minimize or mitigate the effects of electric fields from feeding portions of the tip electrode 1420, ground regions 1422 can be included proximate in the tip portion and/or shaft portion. The ground regions can draw undesired electric field from the feeding portions of the tip electrode 1420 so they do not couple to touch-sensitive device sensors. The shape and placement of the ground regions can be designed to ensure that ground regions do not interfere with the desired electric field generated by the tip electrode (e.g., the spherical portions and some or all of the taper portions). In some examples, the ground region(s) can be designed to be symmetrical with respect to the stylus tip electrode so as to uniformly affect the electric field independent of stylus orientation. For example, as illustrated in FIG. 14B, ground regions 1422 can represent a cross-section of a ground region having a cylindrical shape. In some examples, the ground regions can be incorporated as part of the shield 1412 in FIG. 14A, or alternatively can be separate ground regions in the stylus tip and/or stylus shaft portions.

A stylus tip formed of a non-conductive material such as plastic (and in some cases including an outer coating of paint) can wear down with time. Wear spots can interfere with accurate location detection, and paint wear can be aesthetically unpleasing. In some cases, the stylus can be designed with a removable tip portion, so that the stylus tip portion can be replaced due to wear without replacing the entire stylus device. Additionally, a removable stylus tip can enable a user to replace the tip portion with other tip portions that can provide a different feel or function, such as a brush tip or a different diameter tip, instead of requiring a plurality of different complete stylus devices.

Figure 15:
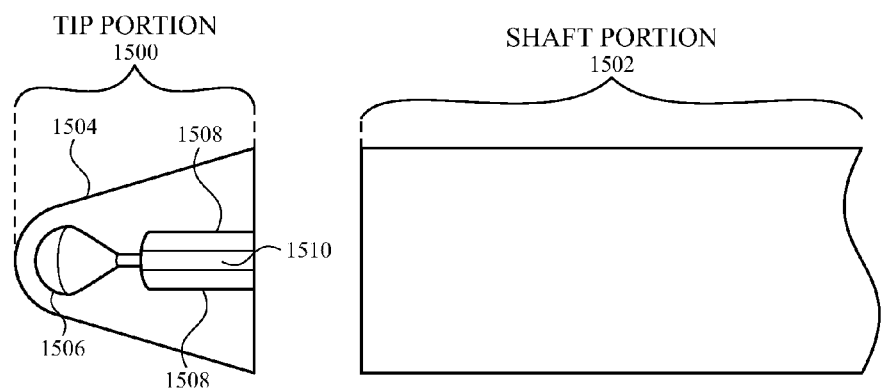
FIG. 15 illustrates an example stylus including a removable stylus tip according to examples of the disclosure.

FIG. 15 illustrates an example stylus including a removable stylus tip according to examples of the disclosure. The example stylus can include a shaft portion 1502 and a removable tip portion 1500. The removable tip 1504 can include a tip electrode 1506 with a spherical portion and a spring-loaded contact member. Alternatively, the tip electrode can be implemented according to other example tip electrodes described herein. The removable tip portion 1500 and shaft portion 1502 can be coupled together with a connector. For example, the connector can be a threaded screw-type connector, plug-in connector, or the like. In some examples, a locking or fastening system between the removable stylus tip portion 1500 and shaft portion 1502 can include a fastening bar, spring fastener and a release button. FIG. 15 illustrates, for example, a cross section of a threaded-screw connector 1508. The mating portion for threaded-screw connector 1508 can be included with shaft portion 1502 of the stylus. In some examples, the ground regions discussed herein can be incorporated into the connector mechanism or proximate to the connector mechanism. Additionally, the removable tip portion can also include a shield 1510 to minimize the electric field effects due to feeding portions or other circuitry.

It should be noted that although often described in the context of a stylus, the examples herein can be applied to other input devices interacting with touch-sensitive surfaces. Additionally, although often described with regard to a touch screen, the input devices can be used with touch-sensitive devices that do not include a touch screen. Additionally, although the example stylus tip electrodes described herein are described as reducing tilt-dependent wobble, the example stylus tip electrodes can also reduce tilt-dependent offset. Tilt-dependent offset, for example, can manifest when drawing a straight line horizontally or vertically across a touch-sensitive device. When stylus is oriented with 0° tilt, the line can end directly under the tip (e.g., due to uniform electric fields at this orientation). However, when the stylus is oriented with a non-zero tilt (e.g., 45° tilt), the non-uniform electric fields can result in an offset which can cause the line to be displayed overshooting (or undershooting) the tip position of the stylus. The example stylus tip electrodes can improve the uniformity of the electric fields, thereby reducing errors in the location detection algorithms to reduced or eliminate tilt-dependent offset. Finally, it should be noted that elements of the examples described herein can be combined in different ways, including adding or omitting various elements illustrated or described herein.

Therefore, according to the above, some examples of the disclosure are directed to an electrode for an input device (e.g., an active stylus). The electrode can comprise a spherical portion and a spring-loaded contact member configured to couple the electrode to stimulation circuitry. Additionally or alternatively to one or more of the examples disclosed above, the electrode can further comprise a tapered portion in which the electrode can linearly taper away from the spherical portion toward the spring-loaded contact member. Additionally or alternatively to one or more of the examples disclosed above, the electrode can further comprise a tapered portion in which the electrode can taper away from the spherical portion toward the spring-loaded contact member forming an elliptical flare. Additionally or alternatively to one or more of the examples disclosed above, the spring-loaded contact member can extend from the neck portion. Additionally or alternatively to one or more of the examples disclosed above, the spring-loaded contact member can extend from the spherical portion.

Some examples of the disclosure are directed to a removable tip portion for an input device (e.g., an active stylus). The tip portion can comprise an electrode including a spherical portion facing a tip of the removable tip portion and a tapered portion in which the electrode can taper away from the tip of the removable tip portion, a first non-conductive material that can be disposed on at least part of the spherical portion of the electrode, and a connector to couple the removable tip portion to another portion of the input device. Additionally or alternatively to one or more of the examples disclosed above, the electrode can linearly taper away from the tip of the removable tip portion. Additionally or alternatively to one or more of the examples disclosed above, the electrode can taper away from the tip of the removable tip portion forming an elliptical flare. Additionally or alternatively to one or more of the examples disclosed above, the electrode can further comprise a spring-loaded contact member configured to couple the electrode to stimulation circuitry. Additionally or alternatively to one or more of the examples disclosed above, the electrode can further comprise a neck portion coupled to the tapered portion. The dimensions of a first surface of the neck portion coupled to the tapered portion can be smaller than or equal to dimensions of a second surface of the tapered portion coupled to the neck portion. Additionally or alternatively to one or more of the examples disclosed above, part of the neck portion of the electrode can be shielded. Additionally or alternatively to one or more of the examples disclosed above, air can fill a first space between the neck portion and the first non-conductive material. Additionally or alternatively to one or more of the examples disclosed above, air can fill a second space between the neck portion and a second non-conductive material. Additionally or alternatively to one or more of the examples disclosed above, the first non-conductive material can be disposed directly on a surface of the electrode. Additionally or alternatively to one or more of the examples disclosed above, the removable tip portion can further comprise one or more ground regions. Additionally or alternatively to one or more of the examples disclosed above, the removable tip portion can further comprise a second non-conductive material that can be disposed between at least part of the electrode and the first non-conductive material.

Some examples of the disclosure are directed to an input device (e.g., an active stylus). The input device can comprise a body, an electrode at the distal end of the input device, a first non-conductive material and stimulation circuitry. The body can include a shaft portion and a tip portion. The electrode can be disposed in the tip portion. The electrode can include a spherical portion facing the distal end of the input device and a tapered portion at which the conducting electrode can taper away from the distal end of the input device. The first non-conductive material can be disposed on at least part of the spherical portion of the electrode. The stimulation circuitry can be coupled to the electrode and can be configured to generate one or more stimulation signals. Additionally or alternatively to one or more of the examples disclosed above, the electrode can linearly taper away from the distal end of the input device. Additionally or alternatively to one or more of the examples disclosed above, the electrode can taper away from the distal end of the input device forming an elliptical flare. Additionally or alternatively to one or more of the examples disclosed above, the electrode can further comprise a spring-loaded contact member configured to couple the electrode to the stimulation circuitry. Additionally or alternatively to one or more of the examples disclosed above, the electrode can further comprise a neck portion coupled to the tapered portion. The dimensions of a first surface of the neck portion coupled to the tapered portion can be smaller than or equal to dimensions of a second surface of the tapered portion coupled to the neck portion. Additionally or alternatively to one or more of the examples disclosed above, part of the neck portion of the electrode can be shielded. Additionally or alternatively to one or more of the examples disclosed above, air can fill a first space between the neck portion of the stylus and the first non-conductive material. Additionally or alternatively to one or more of the examples disclosed above, air can fill a second space between the neck portion of the stylus and a second non-conductive material. Additionally or alternatively to one or more of the examples disclosed above, the first non-conductive material can be disposed directly on a surface of the electrode. Additionally or alternatively to one or more of the examples disclosed above, the input device can further comprise one or more ground regions at the proximal end of the tip portion of the body of the input device. Additionally or alternatively to one or more of the examples disclosed above, the input device can further comprise a second non-conductive material that can be disposed between at least part of the conducting electrode and the first non-conductive material. Additionally or alternatively to one or more of the examples disclosed above, the tip portion of the body of the input device can configured to be separated from the shaft portion of the body of the input device.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A removable tip portion for an input device, the tip portion comprising:
   an electrode including a spherical portion facing a tip of the removable tip portion and a tapered portion in which the electrode tapers away from the tip of the removable tip portion;
   a first non-conductive material disposed on at least part of the spherical portion of the electrode; and
   a connector to couple the removable tip portion to another portion of the input device.

2. The removable tip portion of claim 1, wherein the electrode linearly tapers away from the tip of the removable tip portion.

3. The removable tip portion of claim 1, wherein the electrode tapers away from the tip of the removable tip portion forming an elliptical flare.

4. The removable tip portion of claim 1, the electrode further comprising:
   a spring-loaded contact member configured to couple the electrode to stimulation circuitry.

5. The removable tip portion of claim 1, the electrode further comprising:
   a neck portion coupled to the tapered portion, wherein dimensions of a first surface of the neck portion coupled to the tapered portion are smaller than or equal to dimensions of a second surface of the tapered portion coupled to the neck portion.

6. The removable tip portion of claim 5, wherein part of the neck portion of the electrode is shielded.

7. The removable tip portion of claim 5, wherein air fills a first space between the neck portion and the first non-conductive material or fills a second space between the neck portion and a second non-conductive material.

8. The removable tip portion of claim 1, wherein first non-conductive material is disposed directly on a surface of the electrode.

9. The removable tip portion of claim 1, further comprising a second non-conductive material disposed between at least part of the electrode and the first non-conductive material.

10. The removable tip portion of claim 1, wherein an area of a cross section of the tapered portion is equal to or smaller than an area of a cross section of the spherical portion at an interface between the tapered portion and the spherical portion, wherein the cross section of the tapered portion is parallel to the cross section of the spherical portion.

11. The removable tip portion of claim 1, wherein the electrode tapers away from the tip of the removable tip portion in a plurality of steps, the plurality of steps approximating a linear taper.

12. An input device comprising:
    a body including a shaft portion and a tip portion;
    an electrode at a distal end of the input device and disposed in the tip portion, the electrode including a spherical portion facing the distal end of the input device and a tapered portion at which the conducting electrode tapers away from the distal end of the input device;
    a first non-conductive material disposed on at least part of the spherical portion of the electrode; and
    stimulation circuitry coupled to the electrode and configured to generate one or more stimulation signals.

13. The input device of claim 12, wherein the electrode linearly tapers away from the distal end of the input device.

14. The input device of claim 12, wherein the electrode tapers away from the distal end of the input device forming an elliptical flare.

15. The input device of claim 12, the electrode further comprising:
    a spring-loaded contact member configured to couple the electrode to the stimulation circuitry.

16. The input device of claim 12, the electrode further comprising:
    a neck portion coupled to the tapered portion, wherein dimensions of a first surface of the neck portion coupled to the tapered portion are smaller than or equal to dimensions of a second surface of the tapered portion coupled to the neck portion.

17. The input device of claim 16, wherein part of the neck portion of the electrode is shielded.

18. The input device of claim 16, wherein air fills a first space between the neck portion of the electrode and the first non-conductive material or fills a second space between the neck portion of the electrode and a second non-conductive material.

19. The input device of claim 12, wherein first non-conductive material is disposed directly on a surface of the electrode.

20. The input device of claim 12, further comprising a second non-conductive material disposed between at least part of the conducting electrode and the first non-conductive material.

21. The input device of claim 12, wherein the tip portion of the body of the input device is configured to be separated from the shaft portion of the body of the input device.

22. The input device of claim 12, wherein the electrode tapers away from the distal end of the input device in a plurality of steps, the plurality of steps approximating a linear taper.

* * * * *